Figure 1:
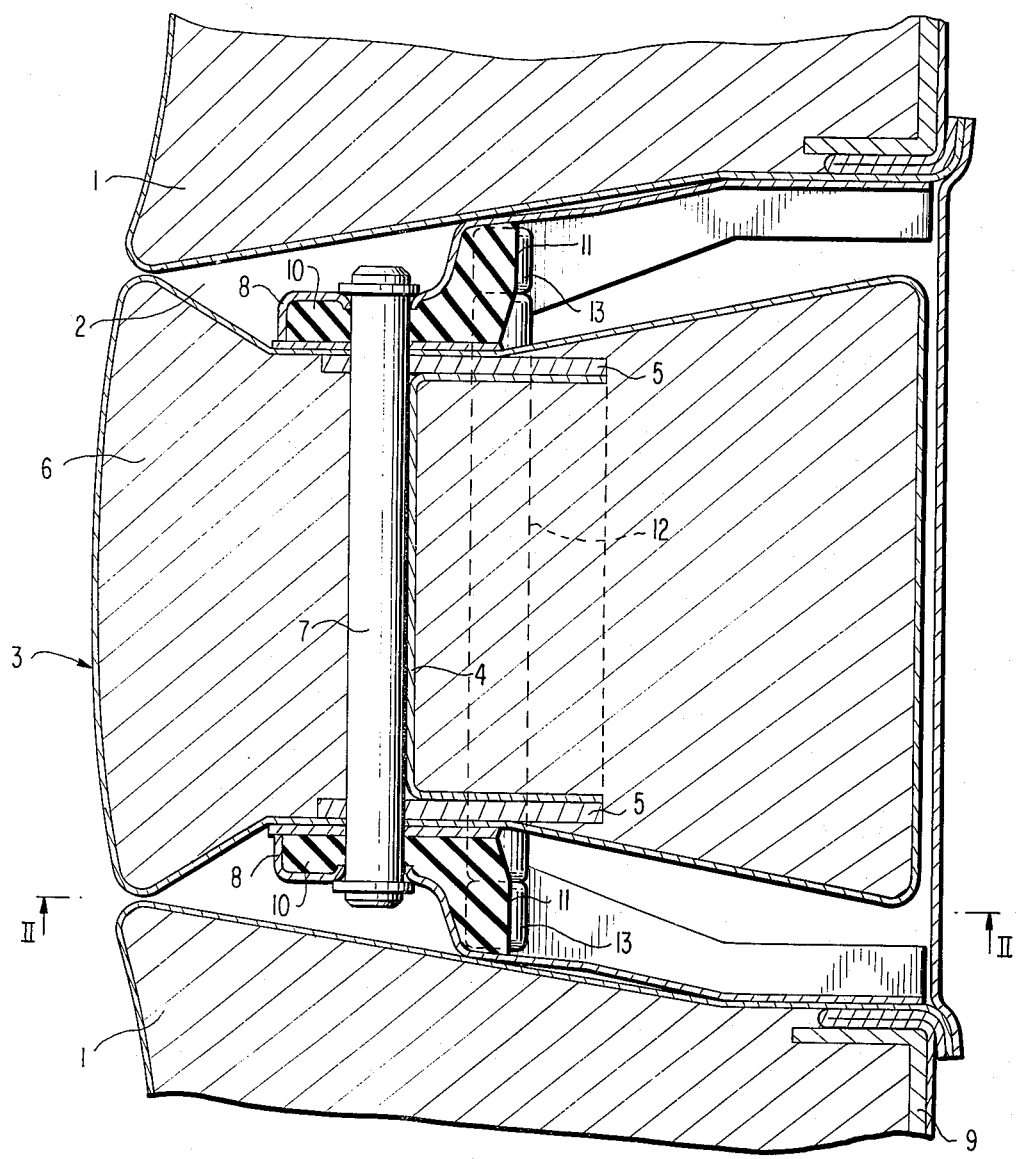

United States Patent
Bonisch et al.

[11] 3,909,063
[45] Sept. 30, 1975

[54] ARMREST IN A MOTOR VEHICLE

[75] Inventors: Herbert Bonisch, Sindelfingen; Bernd Geier, Datzingen, both of Germany

[73] Assignee: Daimler-Benz Aktiengesellschaft, Stuttgart, Germany

[22] Filed: Apr. 8, 1974

[21] Appl. No.: 459,101

[30] Foreign Application Priority Data
Apr. 11, 1973 Germany............................ 2318176

[52] U.S. Cl................................. 297/113; 297/417
[51] Int. Cl.²......................................... A47C 13/00
[58] Field of Search.................. 297/113, 115–117, 297/331, 335, 403, 408, 417, 374, 378, 332, 336

[56] References Cited
UNITED STATES PATENTS
| | | | |
|---|---|---|---|
| 3,542,427 | 9/1968 | Herpel................................ | 297/417 |
| 3,813,149 | 5/1974 | Lawrence et al................... | 297/335 |

*Primary Examiner*—James C. Mitchell
*Attorney, Agent, or Firm*—Craig & Antonelli

[57] ABSTRACT

An arm rest in a motor vehicle adapted to be pivoted between fixed abutments out of a use position into a non-use position and vice versa, in which a non-pivotally arranged elastomer member is provided which exerts a resistance to a pivot movement of the arm rest and secures the end positions of the arm rest.

31 Claims, 2 Drawing Figures

ARMREST IN A MOTOR VEHICLE

The present invention relates to an arm rest in a motor vehicle which is pivotal between fixed abutments out of a use position into a non-use position.

The present invention is concerned with the task to so construct the pivotal support of the arm rest that the arm rest is retained play-free in its two end positions and that pivot movements can be carried out by overcoming holding or restraining forces without requiring any more than a mere manual pivoting of the arm rest.

The underlying problems are solved according to the present invention in that a non-pivotally arranged elastomer member is provided which exerts a resistance to a pivot movement of the arm rest and secures the end positions of the arm rest.

An elastomer member can be manufactured economically. It is exposed to higher pressure loads and stresses during the pivoting of the arm rest only for short periods of time and is only slightly loaded or stressed in the end positions of the arm rest. Since elastomers exhibit a high creep behavior during higher pressure loads, an operating safety over long periods of time is assured thereby.

In one advantageous embodiment of the present invention, the elastomer member may be so constructed that during a pivot movement of the arm rest it exerts a small resistance in a center position whereas it exerts an increasingly larger resistance in the direction toward the abutment.

A roller may be advantageously supported at the arm rest which during a pivot movement of the arm rest rolls along the elastomer member. The roller may thereby serve in a structurally favorable manner simultaneously as abutment member for the fixed stops.

In an arm rest which is to be used as center arm rest in the backrest of a rear seat, one elastomer member and one roller each may be provided on both sides of the arm rest whereby the elastomer members may be held at support brackets carrying the pivot shaft of the arm rest and forming the stops and the rollers may be mounted on a common shaft.

Accordingly, it is an object of the present invention to provide an arm rest for a motor vehicle which avoids by simple means the aforementioned shortcomings and drawbacks encountered in the prior art.

Another object of the present invention resides in an arm rest for a motor vehicle which is retained essentially without play in its two end positions while pivot movements of the arm rest can be carried out by readily overcoming the resistance that is minimal in the center area of the pivot movement.

A further object of the present invention resides in an arm rest for a motor vehicle of the type described above which can be manufactured in a simple and economic manner.

A still further object of the present invention resides in an arm rest for a motor vehicle, particularly in a center arm rest for the back rest of a rear seat of a motor vehicle which excels by relatively high operational reliability and long length of life.

Figure 2:
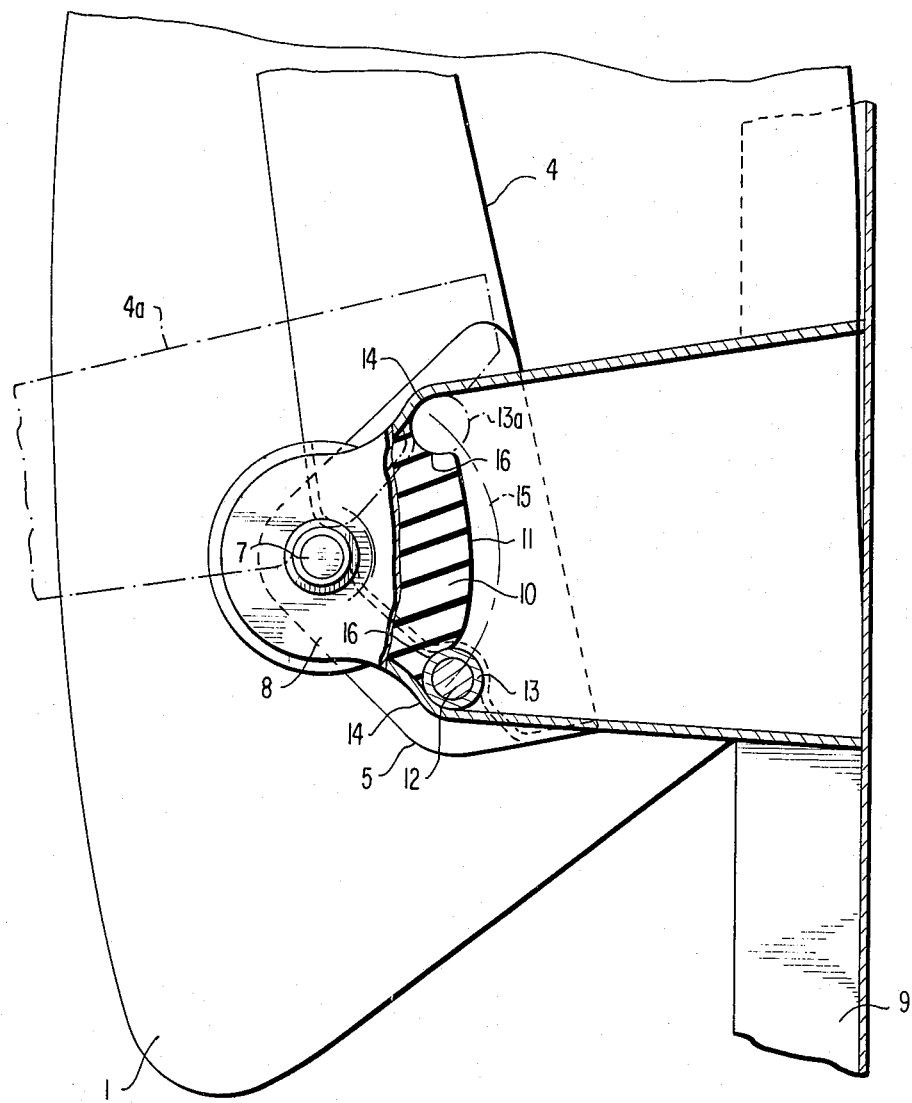

These and other objects, features and advantages of the present invention will become more apparent from the following description when taken in connection with the accompanying drawing which shows, for purposes of illustration only, one embodiment in accordance with the present invention, and wherein:

FIG. 1 is a horizontal cross-sectional view through the pivot bearing support of a center arm rest in accordance with the present invention; and FIG. 2 is a cross-sectional view through the arrangement according to FIG. 1, taken along line II-II.

Referring now to the drawing wherein like reference numerals are used throughout the two views to designate like parts, and more particularly to FIG. 1, reference numeral 3 generally designates therein a center arm rest for a motor vehicle rear seat which is adapted to be tilted out of its non-use position into a use position and vice versa. A recess 2 for the arrangement of the center arm rest 3 is thereby provided in a backrest 1 of the motor vehicle rear seat. This arm rest 3 consists of a support member 4 with reinforcing plates 5 and of a padded body 6. A pivot shaft 7 is fixedly connected with the support member 4 and with the reinforcing plate 5. By means of the pivot shaft 7, the arm rest 3 is supported on both sides thereof in bearing support brackets 8. The bearing support brackets 8 are securely connected with the frame 9 of the backrest 1. Within the area of the pivot shaft 7, the bearing support brackets 8 are constructed as mounting and retaining means for elastomer members 10 which, as can be seen from FIG. 2, have arcuately shaped surfaces 11 that are directed toward the frame 9. Furthermore a shaft 12 is secured at the support member 4 and at the reinforcing plates 5 of the arm rest 3, which projects out of the arm rest 3 on both sides thereof in the direction toward the bearing support brackets 8 and is provided at its end with rollers 13. These rollers 13 roll along the surfaces 11 of the elastomer members 10 during a pivot movement of the arm rest 3 whereby the two end positions of the pivot movement are formed by abutment of the rollers 13 at correspondingly constructed stops 14 formed by the bearing support brackets 8. During a pivot movement of the arm rest 3 the shaft 12 together with the rollers 13 moves along an arc 15 about the pivot shaft 7. The rollers 13 roll along the surface 11. During an abutment at the stops 14, the rollers 13 roll into corresponding recesses 16 of the elastomer members 10. The elastomer members 10 are so dimensioned with their surfaces 11 that in a center position of the arm rest 3 only slight pressures are exerted by the elastomer members 10 on the arm rest 3 by way of the rollers 13 and furthermore in such a manner that this pressure becomes increasingly larger during a pivot movement in the direction toward the stops 14 and some pressure still exists when the rollers 13 rest in the recesses 16. Determinative for this pressure exertion is the fact that the surface 11 lies along a circle whose diameter is larger than the diameter of the circle 15.

In FIG. 2, the folded-down position of the arm rest 3 is indicated by the position of the support member 4 indicated in dash and dot lines which is designated by reference numeral 4a. The corresponding position of the roller 13 is indicated by reference numeral 13a.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

What we claim is:

1. An arm rest in a motor vehicle which is operable to be pivoted between fixed abutment means out of a use position into a non-use position and vice versa, characterized in that a part of said arm rest contacts a non-pivotal elastomer means which exerts a varying resistance to pivotal movement of the arm rest between said use position and said non-use position.

2. An arm rest according to claim 1, characterized in that the elastomer means is so constructed that it exerts a small resistance to the pivotal movement of the arm rest in a center position while it exerts an increasingly larger resistance to the pivotal movement of the arm rest in the direction toward the abutment means.

3. An arm rest according to claim 2, characterized in that a roller means is mounted at the arm rest which, during a pivotal movement of the arm rest, rolls along a surface of the elastomer means.

4. An arm rest according to claim 3, characterized in that the roller means serves simultaneously as abutment member for the fixed abutment means.

5. An arm rest according to claim 4, which is constructed as center arm rest in the backrest of a rear seat, characterized in that one elastomer means and one roller means each are provided on both sides of the arm rest, the elastomer means being retained at support bracket means forming the abutment means and carrying a pivot shaft of the arm rest, and the roller means being mounted on a common shaft.

6. An arm rest according to claim 4, characterized in that the arm rest includes a pivot shaft, relatively fixed support bracket means rotatably supporting the pivot shaft, and support means for supporting said roller means rolling along the surface of the elastomer means.

7. An arm rest according to claim 6, characterized in that said roller means are supported on a common shaft carried by said support means.

8. An arm rest according to claim 7, characterized in that said support means includes a support member of essentially U-shaped cross section with reinforcing plates at both legs of the U.

9. An arm rest according to claim 8, characterized in that the pivot shaft extends through the reinforcing plates and is fixed to the support member.

10. An arm rest according to claim 9, characterized in that the support bracket means forms at the same time retaining means for the elastomer means.

11. An arm rest according to claim 10, characterized in that the roller means during pivotal movement of the arm rest roll along a curved surface of the elastomer means and describe thereby a circular path having as its center point the pivot axis of the pivot shaft.

12. An arm rest according to claim 11, characterized in that the radius of curvature of the curved surface of the elastomer means is greater than the radius of the pivotal movement of the roller means.

13. An arm rest according to claim 1, characterized in that a roller means is mounted at the arm rest which, during a pivotal movement of the arm rest, rolls along the elastomer means.

14. An arm rest according to claim 13, characterized in that the roller means serves simultaneously as abutment member for the fixed abutment means.

15. An arm rest according to claim 1, which is constructed as center arm rest in the backrest of a rear seat, characterized in that one elastomer means and one roller means each are provided on both sides of the arm rest, the elastomer means being retained at support bracket means forming the abutment means and carrying a pivot shaft of the arm rest, and the roller means being mounted on a common shaft.

16. An arm rest according to claim 1, characterized in that the arm rest includes a pivot shaft, relatively fixed support bracket means rotatably supporting the pivot shaft, and support means for supporting roller means which roll along a surface of the elastomer means.

17. An arm rest according to claim 16, characterized in that said roller means are supported on a common shaft carried by said support means.

18. An arm rest according to claim 16, characterized in that said support means includes a support member of essentially U-shaped cross section with reinforcing plates at both legs of the U.

19. An arm rest according to claim 18, characterized in that the pivot shaft extends through the reinforcing plates and is fixed to the support member.

20. An arm rest according to claim 16, characterized in that the support means forms at the same time retaining means for the elastomer means.

21. An arm rest according to claim 16, characterized in that the roller means during pivotal movement of the arm rest roll along a curved surface of the elastomer means and describe thereby a circular path having as its center point the pivot axis of the pivot shaft.

22. An arm rest according to claim 21, characterized in that the radius of curvature of the curved surface of the elastomer means is greater than the radius of the pivot movement of the roller means.

23. An arm rest according to claim 1, characterized in that the elastomer means is provided with a curved surface along which roll roller means of the arm rest, the radius of curvature of the curved surface of the elastomer means being greater than the radius of the pivot movement of the roller means.

24. An arm rest according to claim 1, characterized in that roller means are provided for the arm rest, the elastomer means is provided with a curved surface along which said roller means roll, and characterized in that said roller means are confined to move along a path having a radius of curvature which is smaller than the radius of curvature of the elastomer means surface.

25. An arm rest according to claim 1, characterized in that a curved surface of said elastomer means exerts said varying resistance to pivotal movement of the arm rest.

26. An arm rest according to claim 25, characterized in that said part of the arm rest is confined to move along said curved surface of the elastomer means.

27. An arm rest according to claim 26, characterized in that said part of the arm rest is confined to move along a path having a radius of curvature which is smaller than the radius of curvature of the elastomer means surface.

28. An arm rest according to claim 25, wherein the abutment means comprise recess means provided along said curved surface at ends of said elastomer means.

29. An arm rest in a motor vehicle which is operable to be pivoted between fixed abutment means out of a use position into a non-use position and vice versa, characterized in that a part of said arm rest contacts a non-pivotal elastomer means which exerts resistance to pivotal movement of the arm rest and secures said use position and non-use position in a play-free manner.

30. An arm rest according to claim 29, characterized in that said elastomer means has recess means along a surface thereof which recess means secure said use position and said non-use position.

31. An arm rest according to claim 30, characterized in that said surface is curved in such a manner to exert said resistance to pivotal movement of the arm rest.

* * * * *